US011816910B2

United States Patent
Bulatov et al.

(10) Patent No.: US 11,816,910 B2
(45) Date of Patent: Nov. 14, 2023

(54) APPROXIMATE MODELING OF NEXT COMBINED RESULT FOR STOPPING TEXT-FIELD RECOGNITION IN A VIDEO STREAM

(71) Applicant: Smart Engines Service, LLC, Moscow (RU)

(72) Inventors: Konstantin Bulatovich Bulatov, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 134 days.

(21) Appl. No.: 17/180,238

(22) Filed: Feb. 19, 2021

(65) Prior Publication Data
US 2022/0012484 A1 Jan. 13, 2022

(30) Foreign Application Priority Data

Jul. 7, 2020 (RU) .......................... RU2020122468

(51) Int. Cl.
G06K 9/00 (2022.01)
G06F 16/901 (2019.01)
G06K 9/60 (2006.01)
G06V 30/413 (2022.01)
G06V 10/20 (2022.01)

(52) U.S. Cl.
CPC ........ *G06V 30/413* (2022.01); *G06F 16/9027* (2019.01); *G06V 10/20* (2022.01)

(58) Field of Classification Search
CPC ... G06V 30/413; G06V 10/20; G06F 16/9027
See application file for complete search history.

(56) References Cited

U.S. PATENT DOCUMENTS

| 2001/0012400 A1* | 8/2001 | Wang ................... G06V 30/413 |
| | | 382/181 |
| 2006/0251339 A1* | 11/2006 | Gokturk ................ G06F 16/50 |
| | | 707/E17.022 |
| 2010/0246961 A1* | 9/2010 | Prasad ................. G06F 18/295 |
| | | 382/181 |

(Continued)

OTHER PUBLICATIONS

Yin, Xu-Cheng, et al. "Text detection, tracking and recognition in video: a comprehensive survey." IEEE Transactions on Image Processing 25.6 (2016): 2752-2773. (Year: 2016).*

(Continued)

*Primary Examiner* — Edward F Urban
*Assistant Examiner* — Duy Tran
(74) *Attorney, Agent, or Firm* — Procopio, Cory, Hargreaves & Savitch LLP

(57) ABSTRACT

Approximate modeling of next combined result for stopping text-field recognition in a video stream. In an embodiment, text-recognition results are generated from frames in a video stream and combined into an accumulated text-recognition result. A distance between the accumulated text-recognition result and a next accumulated text-recognition result is estimated based on an approximate model of the next accumulated text-recognition result, and a determination is made of whether or not to stop processing based on this estimated distance. After processing is stopped, the final accumulated text-recognition result may be output.

7 Claims, 7 Drawing Sheets

(56) References Cited

U.S. PATENT DOCUMENTS

| | | | | |
|---|---|---|---|---|
| 2014/0112527 | A1* | 4/2014 | Nister | G06V 20/635 |
| | | | | 382/176 |
| 2017/0116494 | A1* | 4/2017 | Isaev | G06V 20/46 |
| 2017/0242921 | A1* | 8/2017 | Rota | G06F 16/353 |

OTHER PUBLICATIONS

Yin, Xu-Cheng, et al. "Text detection, tracking and recognition in video: a comprehensive survey." IEEE Transactions on Image Processing 25.6 (2016): 2752-2773. (Year: 2016) (Year: 2016).*

Y. Chen, J. Pont-Tuset, A. Montes, and L. V. Gool, "Blazingly fast video object segmentation with pixel-wise metric learning," in 2018 IEEE/CVF Conference on Computer Vision and Pattern Recognition, 2018, pp. 1189-1198.

H. Xiao, J. Feng, G. Lin, Y. Liu, and M. Zhang, "MoNet: Deep motion exploitation for video object segmentation," in 2018 IEEE/CVF Conference on Computer Vision and Pattern Recognition, 2018, pp. 1140-1148.

R. Girdhar, G. Gkioxari, L. Torresani, M. Paluri, and D. Tran, "Detect and- track: Efficient pose estimation in videos," in 2018 IEEE/CVF Conference on Computer Vision and Pattern Recognition, 2018, pp. 350-359.

C. Lin and Y. Hung, "A prior-less method for multi-face tracking in unconstrained videos," in 2018 IEEE/CVF Conference on Computer Vision and Pattern Recognition, 2018, pp. 538-547.

Y. Jo, S. W. Oh, J. Kang, and S. J. Kim, "Deep video super-resolution network using dynamic upsampling filters without explicit motion compensation," in 2018 IEEE/CVF Conference on Computer Vision and Pattern Recognition, 2018, pp. 3224-3232.

Z. Cheng, J. Lu, J. Xie, Y. Niu, S. Pu, and F. Wu, "Efficient video scene text spotting: Unifying detection, tracking, and recognition," arXiv preprint:1903.03299, 2019.

B. A. Dangiwa and S. S. Kumar, "A business card reader application for iOS devices based on Tesseract," in 2018 International Conference on Signal Processing and Information Security (ICSPIS), 2018, pp. 1-4.

N. Islam, Z. Islam, and N. Noor, "A survey on optical character recognition system," arXiv preprint:1710.05703, 2017.

K. Ravneet, "Text recognition applications for mobile devices," Journal of Global Research in Computer Science, vol. 9, No. 4, pp. 20-24, 2018.

H. Jabnoun, F. Benzarti, and H. Amiri, "A new method for text detection and recognition in indoor scene for assisting blind people," in Proc. SPIE (ICMV 2016), vol. 10341, 2017.

M. Kišš, M. Hrads, and O. Kodym, "Brno Mobile OCR Dataset," in International Conference on Document Analysis and Recognition (ICDAR). IEEE, 2019, pp. 1352-1357.

M. O. V. Ngoc, J. Fabrizio, and T. G'eraud, "Document detection in videos captured by smartphones using a saliency-based method," in International Conference on Document Analysis and Recognition Workshops (ICDARW), 2019, pp. 19-24.

F. S. Bashiri, E. LaRose, J. C. Badger, R. M. D'Souza, Z. Yu, and P. Peissig, "Object detection to assist visually impaired people: A deep neural network adventure," in Advances in Visual Computing, G. Bebis, R. Boyle, B. Parvin, D. Koracin, M. Turek, S. Ramalingam, K. Xu, S. Lin, B. Alsallakh, J. Yang, E. Cuervo, and J. Ventura, Eds., 2018, pp. 500-510.

M. Cutter and R. Manduchi, "Towards Mobile OCR: How to take a good picture of a document without sight," in Proceedings of the ACM Symposium on Document Engineering, 2015, pp. 75-84.

E. Tekin, J. M. Coughlan, and H. Shen, "Real-time detection and reading of led/lcd displays for visually impaired persons," in IEEE Workshop on Applications of Computer Vision (WACV), 2011, pp. 491-496.

V. Arlazarov, K. Bulatov, T. Chernov, and V. Arlazarov, "MIDV-500: a dataset for identity document analysis and recognition on mobile devices in video stream," Computer Optics, vol. 43, pp. 818-824, Oct. 2019, doi:10.18287/2412-6179-2019-43-5-818-824.

M. O. V. Ngoc, J. Fabrizio, and T. G'eraud, "Saliency-based detection of 4identy documents captured by smartphones," in 13th IAPR International Workshop on Document Analysis Systems (DAS), 2018, pp. 387-392.

N. Skoryukina, V. V. Arlazarov, and D. P. Nikolaev, "Fast method of ID documents location and type identification for mobile and server application," in International Conference on Document Analysis and Recognition (ICDAR). IEEE, 2019, pp. 850-857.

M. A. Povolotskiy, D. V. Tropin, T. S. Chernov, and B. I. Savelyev, "Dynamic programming approach to textual structured objects segmentation in images," Informatsionnye tekhnologii i vychislitelnye sistemy (Information technologies and computational systems), vol. 3, pp. 66-78, 2019, (In Russian).

S. Bakkali, Z. Ming, M. M. Luqman, and J.-C. Burie, "Face detection in camera captured images of identity documents under challenging conditions," in International Conference on Document Analysis and Recognition Workshops (ICDARW), 2019, pp. 55-60.

K. Bulatov, V. V. Arlazarov, T. Chernov, O. Slavin, and D. Nikolaev, "Smart IDReader: Document recognition in video stream," in 14th International Conference on Document Analysis and Recognition (ICDAR), vol. 6. IEEE, 2017, pp. 39-44.

M. Ryan and N. Hanafiah, "An examination of character recognition on ID card using template matching approach," Procedia Computer Science, vol. 59, pp. 520-529, 2015.

K. Bulatov, "A method to reduce errors of string recognition based on combination of several recognition results with per-character alternatives," Bulletin of the South Ural State University. Ser. Mathematical Modelling, Programming & Computer Software, vol. 12, No. 3, pp. 74-88, 2019.

J. Greenhalgh and M. Mirmehdi, "Recognizing Text-Based Traffic Signs," IEEE Transactions on Intelligent Transportation Systems, vol. 16, No. 3, pp. 1360-1369, 2015, doi:10.1109/TITS.2014.2363167.

S. Christensen and A. Irle, "The monotone case approach for the solution of certain multidimensional optimal stopping problems," arXiv preprint:1705.01763, 2019.

T. Ferguson and M. Klass, "House-hunting without second moments," Sequential Analysis, vol. 29, No. 3, pp. 236-244, 2010.

V. V. Arlazarov, K. Bulatov, T. Manzhikov, O. Slavin, and I. Janiszewski, "Method of determining the necessary number of observations for video stream documents recognition," in Proc. SPIE (ICMV 2017), vol. 10696, 2018.

K. Bulatov, N. Razumnyi, and V. V. Arlazarov, "On optimal stopping strategies for text recognition in a video stream as an application of a monotone sequential decision model," International Journal on Document Analysis and Recognition, vol. 22, No. 3, pp. 303-314, 2019.

K. Bulatov, B. Savelyev, and V. V. Arlazarov, "Next integrated result modelling for stopping the text field recognition process in a video using a result model with per-character alternatives," in Twelfth International Conference on Machine Vision (ICMV 2019), vol. 11433. SPIE, Jan. 2020, pp. 710-716, doi:10.1117/12.2559447.

R. Llobet, J. Cerdan-Navarro, J. Perez-Cortes, and J. Arlandis, "OCR post-processing using weighted finite-state transducers," in 20th International Conference on Pattern Recognition, 2010, pp. 2021-2024.

L. Yujian and L. Bo, "A normalized levenshtein distance metric," IEEE Transactions on Pattern Analysis and Machine Intelligence, vol. 29, No. 6, pp. 1091-1095, 2007.

J. G. Fiscus, "A post-processing system to yield reduced word error rates: Recognizer Output Voting Error Reduction (ROVER)," in IEEE Workshop on Automatic Speech Recognition and Understanding, 1997, pp. 347-354.

G. E. Blelloch and M. Reid-Miller, "Fast set operations using treaps," in Proceedings of the Tenth Annual ACM Symposium on Parallel Algorithms and Architectures, ser. SPAA '98. ACM, 1998, pp. 16-26. [Online]. Available: http://doi.acm.org/10.1145/277651.277660.

K. Bulatov, D. Matalov, and V. Arlazarov, "MIDV-2019: challenges of the modern mobile-based document OCR," in Twelfth International Conference on Machine Vision (ICMV 2019), vol. 11433. SPIE, Jan. 2020, pp. 717-722, doi:10.1117/12.2558438.

(56) References Cited

OTHER PUBLICATIONS

Y. S. Chernyshova, A. V. Sheshkus, and V. V. Arlazarov, "Two-Step CNN Framework for Text Line Recognition in Camera-Captured Images," IEEE Access, vol. 8, pp. 32 587-32 600, 2020, doi:10.1109/ACCESS.2020.2974051.
S. Zilberstein, "Using anytime algorithms in intelligent systems," AI Magazine, vol. 17, No. 3, pp. 73-83, 1996.

\* cited by examiner

FIG. 6
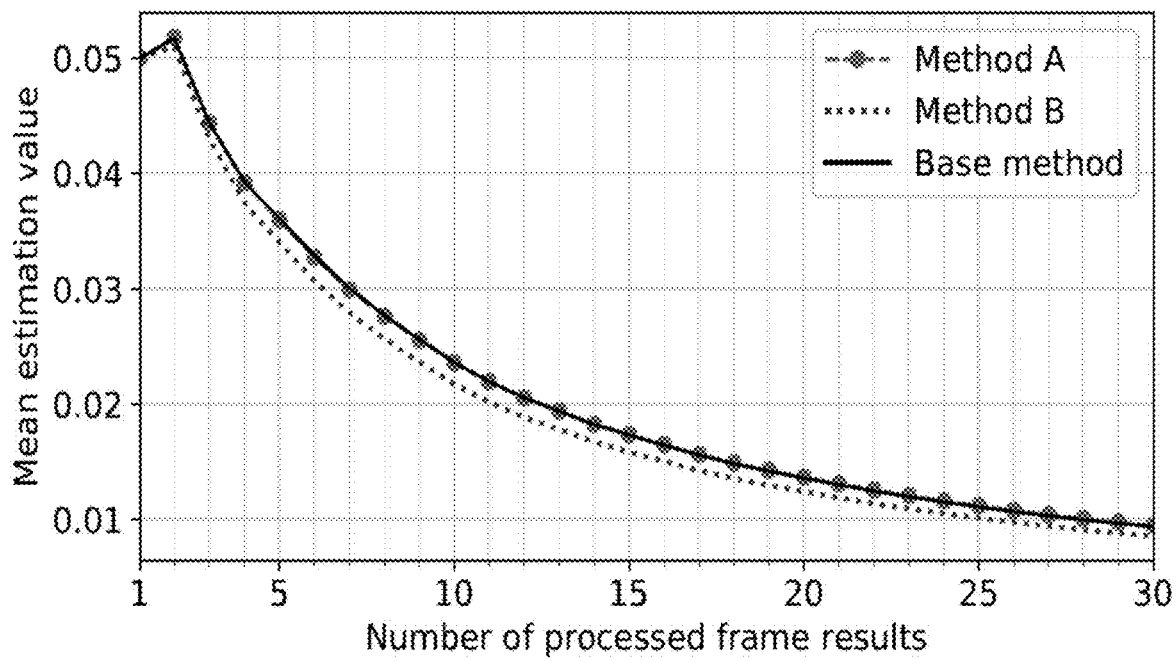
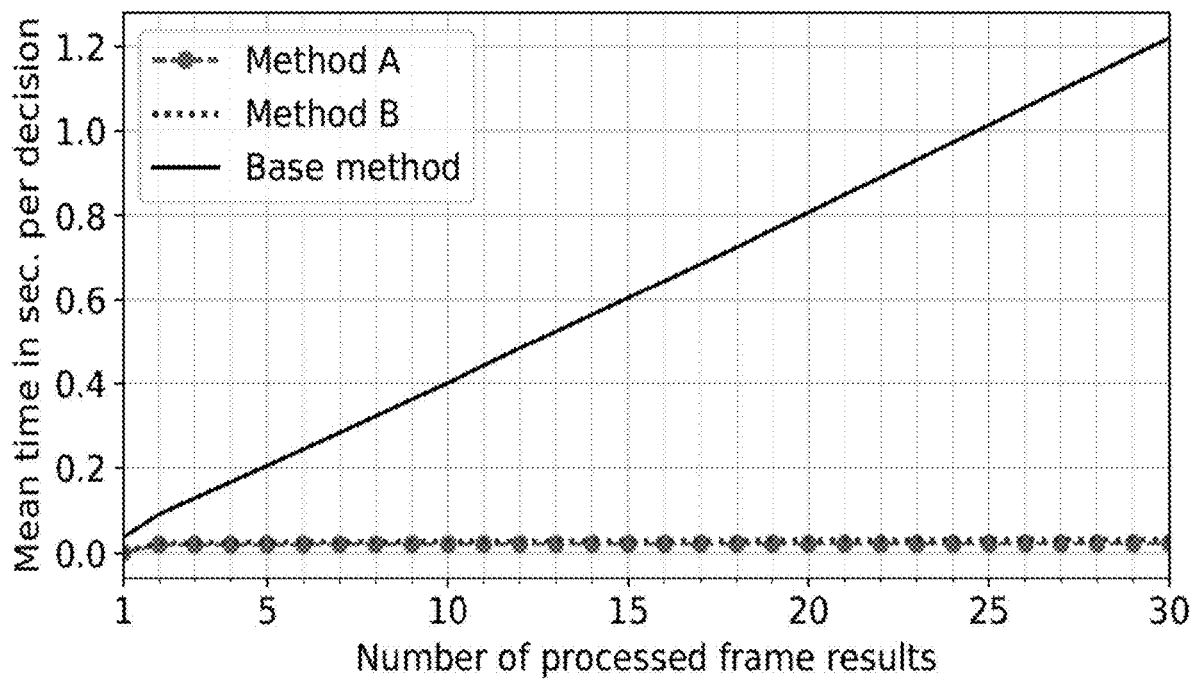
FIG. 7

APPROXIMATE MODELING OF NEXT COMBINED RESULT FOR STOPPING TEXT-FIELD RECOGNITION IN A VIDEO STREAM

CROSS-REFERENCE TO RELATED APPLICATIONS

This application claims priority to Russian Patent App. No. 2020122468, filed on Jul. 7, 2020, which is hereby incorporated herein by reference as if set forth in full.

BACKGROUND

Field of the Invention

The embodiments described herein are generally directed to text recognition in a video stream, and, more particularly, to the stopping decision in a video-stream text-recognition process.

Description of the Related Art

Video processing has become a rich and dynamic branch of research in the field of computer vision. Common problems encountered during analysis of video streams include object detection and segmentation, object tracking, super-resolution, text recognition, and more. Some solutions to these problems are detailed, for example, in "Blazingly fast video object segmentation with pixel-wise metric learning," Chen et al., 2018 IEEE/CVF Conference on Computer Vision and Pattern Recognition (CVPR), pp. 1189-98, 2018, "Monet: Deep motion exploitation for video object segmentation," Xiao et al., 2018 IEEE/CVF Conference on CVPR, pp. 1140-8, 2018, "Detect-and-track: Efficient pose estimation in videos, Girdhar et al., 2018 IEEE/CVF Conference on CVPR, pp. 350-9, 2018, "A prior-less method for multi-face tracking in unconstrained videos," Lin et al., 2018 IEEE/CVF Conference on CVPR, pp. 538-47, 2018, "Deep video super-resolution network using dynamic upsampling filters without explicit motion compensation," Jo et al., 2018 IEEE/CVF Conference on CVPR, pp. 3224-32, 2018, and "Efficient video scene text spotting: Unifying detection, tracking, and recognition," Cheng et al., arXiv preprint: 1903.03299, 2019, which are all hereby incorporated herein by reference as if set forth in full. Modern computer-vision applications employ methods of automated video processing, not only for high-end industrial vision systems, but also for mobile devices such as smartphones or tablet computers.

One of the most relevant computer vision problems for mobile devices is automated data entry by means of text recognition. Text detection and recognition on mobile devices has applications in business process automation, mobile government services, mobile payments, life augmentation for people with disabilities, and more. Examples of such applications are detailed, for example, in "A business card reader application for iOS devices based on Tesseract," Dangiwa et al., 2018 Int'l Conference on Signal Processing and Information Security (ICSPIS), pp. 1-4, 2018, "A survey on optical character recognition system," Islam et al., arXiv preprint:1710.05703, 2017, "Text recognition applications for mobile devices," Ravneet, Journal of Global Research in Computer Science, vol. 9, no. 4, pp. 20-4, 2018, and "A new method for text detection and recognition in indoor scene for assisting blind people," Jabnoun et al., Proc. SPIE of Int'l Conference on Machine Vision (ICMV) 2016, vol. 10341, 2017, which are all hereby incorporated herein by reference as if set forth in full.

Research has primarily sought to improve the speed and accuracy of camera-based information extraction, given particularly challenging conditions, such as poor illumination, low camera quality, optical distortions and noise, and poor focus and motion blur. Additional challenges arise due to the expectation of such systems to be autonomous, in order to minimize the possibility of sensitive data leaks, and for the systems to operate in real time, which is especially relevant for the assistance of those who are visually impaired. Examples of research in this area include "Brno Mobile OCR Dataset," Kišš et al., IEEE Int'l Conference on Document Analysis and Recognition (ICDAR), pp. 1352-7, 2019, "Document detection in videos captured by smartphones using a saliency-based method," Ngoc et al., ICDAR Workshops, pp. 19-24, 2019, "Object detection to assist visually impaired people: A deep neural network adventure," Bashiri et al., in Advances in Visual Computing, Bebis et al., pp. 500-10, 2018, "Towards Mobile OCR: How to take a good picture of a document without sight," Cutter et al., Proceedings of the ACM Symposium on Document Engineering, pp. 75-84, 2018, and "Real-time detection and reading of LED/LCD displays for visually impaired persons," IEEE Workshop on Applications of Computer Vision, pp. 491-6, 2011, which are all hereby incorporated herein by reference as if set forth in full.

A particular case of mobile recognition is represented by systems for recognizing images of identity documents captured by mobile devices. The recognition of identity documents is encumbered by specific features of such documents, such as textured backgrounds, holographic security elements obstructing the text recognition, reflective document surfaces which are prone to highlights, and the like. Such features are discussed, for example, in "MIDV-500: a dataset for identity document analysis and recognition on mobile devices in video stream," Arlazarov et al., Computer Optics, vol. 43, pp. 818-24, doi:10.18287/2412-6179-2019-43-5-818-824, October 2019, which is hereby incorporated herein by reference as if set forth in full. At the same time, an important aspect of such recognition systems is their low tolerance for error. The cost of recognition mistakes is high, since the recognized data is used for personal identification, government services, financial transactions, and/or other highly sensitive applications. The scope of problems in computer vision, related to the recognition of identity documents, includes document detection and location, document layout analysis, face detection, and text-field recognition. These problems are discussed, for example, in "Saliency-based detection of identity documents captured by smartphones," Ngoc et al., 13th IAPR Int'l Workshop on Document Analysis Systems, pp. 387-92, 2018, "Fast method of ID documents location and type identification for mobile and server application," Skoryukina et al., IEEE ICDAR, pp. 850-7, 2019, "Dynamic programming approach to textual structured objects segmentation in images," Povolotskiy et al., Information Technologies and Computational Systems, vol. 3, pp. 66-78, 2019, "Face detection in camera captures images of identity documents under challenging conditions," Bakkali et al., ICDAR Workshops, pp. 55-60, 2019, "Smart IDReader: Document recognition in video stream," Bulatov et al., IEEE 14th ICDAR, vol. 6, pp. 39-44, 2017, and "An examination of character recognition on ID card using template matching approach," Ryan et al., Procedia Computer Science, vol. 59, pp. 520-9, 2015, which are all hereby incorporated herein by reference as if set forth in full.

FIG. 1 illustrates a typical use case for information extraction from an identity document using the camera of a mobile device.

Using video input in a mobile document-recognition system presents an opportunity to reduce the text-field recognition errors, thereby increasing the reliability of information extraction. See, e.g., "A method to reduce errors of string recognition based on combination of several recognition results with per-character alternatives," Bulatov, Bulletin of the South Ural State University, Ser. Mathematical Modelling, Programming & Computer Software, vol. 12, no. 3, pp. 74-88, 2019 (hereafter "Bulatov$_1$"), which is hereby incorporated herein by reference as if set forth in full. Combining multiple recognition results for the same text field, obtained from different image frames in the video, has been shown to be an effective means of improving the accuracy of video-stream recognition. See, e.g., Bulatov$_1$, and "Recognizing Text-Based Traffic Signs," Greenhalgh et al., IEEE Transactions on Intelligent Transportation Systems, vol. 16, no. 3, pp. 1360-9, doi:10/1109/TITS.2014.2363167, 2015, which is hereby incorporated herein by reference as if set forth in full. Some parallels can be drawn between such combination methods and the use of model ensembles to recognize the same image with multiple algorithms.

However, the use of video input for document recognition gives rise to a problem: how to determine when there is enough accumulated information, such that the video-stream recognition process should be stopped. Without access to the ground truth, this stopping decision should be able to be made regardless of whether or not the result could be improved and regardless of whether or not more time is justified to recognize additional image frames in an effort to improve the combined result. The stopping decision is particularly crucial for real-time tracking and recognition of multiple objects, such as text in vehicle license plates or traffic signs, as discussed in Greenhalgh et al. However, despite its importance for video processing, the problem of optimal stopping has not been previously explored in the field of computer vision.

SUMMARY

Accordingly, systems, methods, and non-transitory computer-readable media are disclosed for determining when to stop a video-stream recognition process.

In an embodiment, a method comprises using at least one hardware processor to: until a determination to stop processing is made, for each of a plurality of image frames in a video stream, receive the image frame, generate a text-recognition result from the image frame, wherein the text-recognition result comprises a vector of class estimations for each of one or more characters, combine the text-recognition result with an accumulated text-recognition result, estimate a distance between the accumulated text-recognition result and a next accumulated text-recognition result based on an approximate model of the next accumulated text-recognition result, and determine whether or not to stop the processing based on the estimated distance; and, after stopping the processing, output a character string based on the accumulated text-recognition result. Estimating the distance between the accumulated text-recognition result and a next accumulated text-recognition result may comprise modeling the next accumulated text-recognition result by using previous text-recognition results as candidates for a next text-recognition result. The distance between the accumulated text-recognition result and a next accumulated text-recognition result may be estimated as:

$$\hat{\Delta}_n = \frac{1}{n+1}\left(\delta + \sum_{i=1}^{n}\sum_{j=1}^{S_n}\sum_{k=0}^{K}\Delta_{ijk}\right)$$

wherein $\hat{\Delta}_n$ is the estimated distance, wherein n is a current number of image frames for which text-recognition results have been combined with the accumulated text-recognition result, wherein δ is an external parameter, wherein $S_n$ is a number of vectors of class estimations in the accumulated text-recognition result, wherein K is a number of classes represented in each vector of class estimations in the accumulated text-recognition result, and wherein $\Delta_{ijk}$ is a contribution to the estimated distance by a class estimation for a k-th class to a j-th component of the accumulated text-recognition result from the vector of class estimations in the text-recognition result generated from an i-th image frame.

In an embodiment, $\Delta_{ijk}$ is calculated as:

$$\Delta_{ijk} = \frac{1}{2}\left|\frac{A_{jk}}{W} - \frac{A_{jk} + y_{ijk}w_i}{W + w_i}\right|,$$

wherein $A_{jk}$ is a weighted sum of class estimations for the k-th class corresponding to the j-th component of the accumulated text-recognition result, wherein $y_{ijk}$ is a class estimation for the k-th class that was merged into the j-th component of the accumulated text-recognition result from the vector of class estimations in the text-recognition result generated from the i-th image frame, wherein $w_i$ is a weight associated with the text-recognition result generated from the i-th image frame, and wherein W is a sum of all weights $w_i$.

In an embodiment, $\Delta_{ijk}$ is calculated as:

$$\Delta_{ijk} = \frac{|A_{jk} - n \cdot y_{ijk}|}{2n(n+1)},$$

wherein $A_{jk}$ is a sum of class estimations for the k-th class corresponding to the j-th component of the accumulated text-recognition result, and wherein $y_{ijk}$ is a class estimation for the k-th class that was merged into the j-th component of the accumulated text-recognition result from the vector of class estimations in the text-recognition result generated from the i-th image frame.

In an embodiment, $\Sigma_{i=1}^{n}\Delta_{ijk}$ is calculated as:

$$\sum_{i=1}^{n}\Delta_{ijk} = \frac{1}{n(n+1)}(A_{jk} \cdot |L_{jk}| - n \cdot B_{jk}),$$

$L_{jk} \subset \{1, 2, \ldots, n\}$, such that $\forall\, i \in L_{jk}: n \cdot y_{ijk} < A_{jk}$, $$B_{jk} = \sum_{i \in L_{jk}} y_{ijk},$$

wherein $A_{jk}$ is a sum of class estimations for the k-th class corresponding to the j-th component of the accumulated text-recognition result, and wherein $y_{ijk}$ is a class estimation for the k-th class that was merged into the j-th component of the accumulated text-recognition result from the vector of class estimations in the text-recognition result generated from the i-th image frame. Values of $y_{ijk}$ may be stored in one or more balanced binary search trees.

Estimating the distance between the accumulated text-recognition result and a next accumulated text-recognition result may further comprise, for each of the previous text-recognition results, calculating a distance between the accumulated text-recognition result and a combination of the accumulated text-recognition result with the previous text-recognition result.

Calculating a distance between the accumulated text-recognition result and a combination of the accumulated text-recognition result with the previous text-recognition result may comprise aligning the accumulated text-recognition result with the previous text-recognition result based on a previous alignment of the accumulated text-recognition result with the previous text-recognition result.

The distance between the accumulated text-recognition result and the next accumulated text-recognition result may be estimated as:

$$\hat{\Delta}_n = \frac{1}{n+1}\left(\delta + \sum_{i=1}^{n} \rho(R_n, R(X_1, \ldots, X_n, X_i))\right),$$

wherein $\hat{\Delta}_n$ is the estimated distance, wherein n is a current number of image frames for which text-recognition results have been combined with the accumulated text-recognition result, wherein $\delta$ is an external parameter, wherein $\rho$ is a distance metric function, wherein $R_n$ is the accumulated text-recognition result, and wherein $R(X_1, \ldots, X_n, X_i)$ is a combination of all text-recognition results, that have been previously combined to form the accumulated text-recognition result, with a text-recognition result from an i-th image frame.

The distance between the accumulated text-recognition result and a next accumulated text-recognition result may be calculated using:

$$\frac{2G_n}{G_n + 2S_n},$$

wherein $G_n$ is a sum of generalized Levenshtein distances between the accumulated text-recognition result and combinations of the accumulated text-recognition result with the previous text-recognition results, and wherein $S_n$ is a number of vectors of class estimations in the accumulated text-recognition result.

The at least one hardware processor may comprised in a mobile device, wherein the image frames are received in real time or near-real time as the image frames are captured by a camera of the mobile device.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 illustrates a plot of mean estimation value to stages, according to experimental evaluations of embodiments of disclosed methods;

FIG. 7 illustrates a plot of mean calculation time to stages, according to experimental evaluations of embodiments of disclosed methods.

DETAILED DESCRIPTION

In an embodiment, systems, methods, and non-transitory computer-readable media are disclosed for determining when to stop a video-stream recognition process. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Example Processing Device

Figure 1:
FIG. 1 illustrates an example of text recognition and extraction from an identity document using a mobile device, according to an embodiment.
Figure 2:
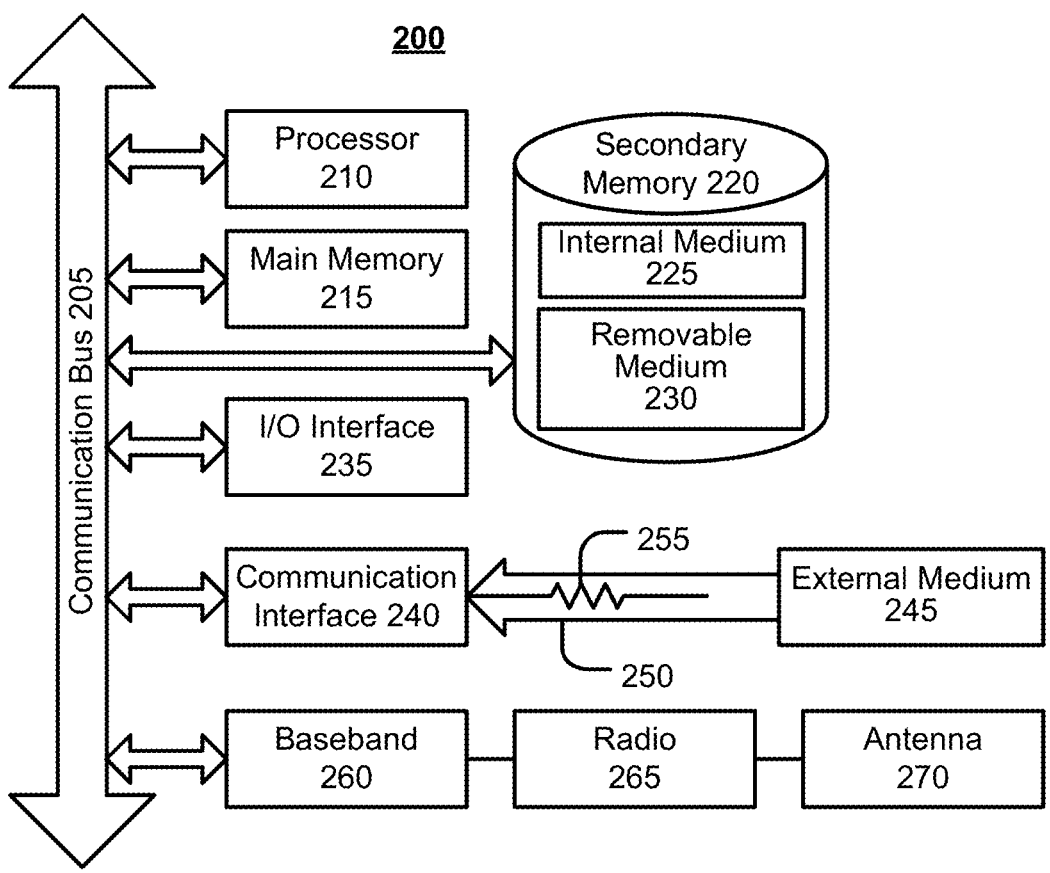
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application, the disclosed text-recognition module, or one or more other software modules of the application) described herein. System 200 can be a server, mobile device (e.g., smartphone, tablet computer, laptop computer, etc.), any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210.

Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers, scanners, cameras, etc.), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

In an embodiment, I/O interface 235 provides an interface to a camera (not shown). for example, system 200 may be a mobile device, such as a smartphone, tablet computer, or laptop computer, with one or more integrated cameras (e.g., rear and front facing cameras). Alternatively, system 200 may be a desktop or other computing device that is connected via I/O interface 235 to an external camera. In either case, the camera captures images (e.g., photographs, video, etc.) for processing by processor(s) 210 (e.g., executing the disclosed software) and/or storage in main memory 215 and/or secondary memory 220.

System 200 may also include optional wireless communication components that facilitate wireless communication over a voice network and/or a data network (e.g., in the case of a mobile device). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215, which may be random access memory (RAM), or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.2. Example System

The disclosed method of text recognition may be implemented as a stand-alone software application or as a text-recognition module within a larger software application. The application may be fully hosted and executed on a user system, such as a mobile device (e.g., smartphone, tablet computer, laptop computer, etc.) or desktop computer, or fully hosted and executed on a server system (e.g., a web server that provides a website or web service). Alternatively, the application may be a distributed application, with one or more functions hosted and executed as one or more software modules on a user system and one or more other functions hosted and executed as one or more software modules on a server system. In this case, the text-recognition module of the application may be performed client-side on the user system, server-side on the server system, or may itself be distributed with one or more of its functions performed by the user system and one or more other functions performed by the server system.

In an embodiment, in which the text recognition is performed as part of a larger software application, the text-recognition module may receive an input from one module of the application and provide an output to another module of the application. For example, the text-recognition module may receive a video of a document as the input, and provide text, extracted from the video of the document, as the output. The application may then utilize the provided text to perform some other function, such as an identity search or verification in the case that the document is an identity document, a check deposit in the case that the document is a check, general data entry, and/or the like.

2. Process Overview

Embodiments of processes for determining when to stop a video-stream recognition process will now be described in detail. It should be understood that the described processes may be embodied in one or more software modules that are executed by one or more hardware processors 210, client-side, server-side, or distributed across both a user system and a server system. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps or subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Overall Process

Figure 3:
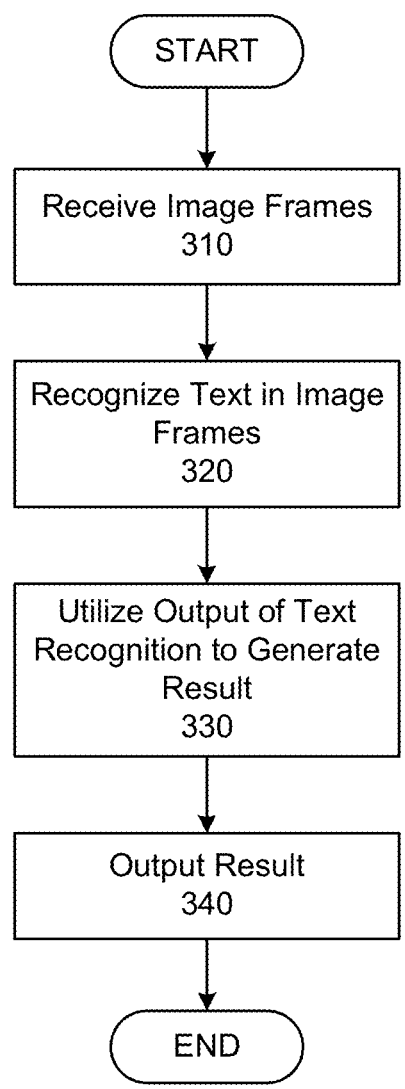
FIG. 3 illustrates a process in which text recognition may be performed, according to an embodiment.

FIG. 3 illustrates a process 300 in which text recognition may be performed, according to an embodiment. Process 300 may be performed by a user system or a server system. Alternatively, process 300 may be a distributed process with some subprocesses, such as subprocesses 310 and 320, being performed client-side by a user system and other subprocesses, such as subprocesses 330 and 340, being performed server-side by a server system. It should be understood that subprocess 320 represents the disclosed text-recognition module, which may form part of a larger application that implements process 300. Alternatively, the text-recognition module may implement subprocess 320 as a stand-alone process by itself or in combination with subprocess 310.

In subprocess 310, image frames from a video stream are received. Subprocess 310 may comprise capturing a video stream of a document using a digital camera (e.g., a small-scale digital camera integrated into or connected to a mobile device). Alternatively, subprocess 310 may comprise simply receiving the video of a document or image frames extracted from the video of a document.

In subprocess 320, the text-recognition module processes images of text, represented in the image frames, to recognize text in the document. During subprocess 320, the image frames may also be pre-processed and/or post-processed. For example, the image frames may be cropped to isolate text field(s) in the image frames, and the text recognition may only be performed on the cropped images of the isolated text field(s). Subprocess 320 may recognize text in the image frames in real time or near-real time as a video stream is being captured (e.g., in parallel with subprocess 310), or may recognize text in the image frames after a video has been captured (e.g., after subprocess 310 is complete). In the event that subprocess 320 is recognizing text in the image frames in real time or near-real time as a video stream is being captured, at some point subprocess 320 will make a stopping decision, indicating that processing of the video stream can be stopped and/or automatically terminating the video-stream recognition processing. In addition, this stopping decision may automatically terminate capture of the video stream, provide an indication to the user that he or she can stop capturing the video stream, and/or otherwise facilitate termination of the video stream.

In subprocess 330, the output of the text recognition in subprocess 320 may be utilized in one or more additional subprocesses to produce a result that is output in subprocess 340. For example, subprocess 330 may utilize the recognized text to perform functions such as an identity search or verification, financial transaction (e.g., check deposit), general data entry, and/or any other function for which Optical Character Recognition (OCR) is used. It should be understood that the output of the text recognition in subprocess 320 may comprise a text string (e.g., a string of alphanumeric characters and/or any other characters that may be present in a printed document). Alternatively or additionally, the output of the text recognition in subprocess 320 may comprise a sequence of character recognition results that each map a set of character labels (e.g., a set of alphabetic, numeric, or alphanumeric characters) to a set of numerical estimations, as discussed elsewhere herein.

2.2. Stopping Determination in Text-Recognition Process

An embodiment of the text-recognition module, used in or implementing subprocess 320, will now be described in detail. The text-recognition module will primarily be described with respect to its improvement over prior methods, i.e., the determination of when to stop the text-recognition process. It should be understood that any functions of the text-recognition process that are not specifically described herein may utilize any standard or non-standard implementation that is known in the art.

2.2.1. Introduction

Optimal stopping is a known problem in the field of decision theory, mathematical statistics, and economics, and new theoretical results continue to be produced for different variations. See, e.g., "The monotone case approach for the solution of certain multidimensional optimal stopping problems," Christensen et al., arXiv preprint:1705.01763, 2019, and "House-hunting without second moments," Ferguson et al., Sequential Analysis, vol. 29, no. 3, pp. 236-44, 2010, which are both hereby incorporated herein by reference as if set forth in full. Methods for stopping a video-stream recognition process were proposed in "Method of determining the necessary number of observations for video stream documents recognition," Arlazarov et al., Proc. SPIE (ICMV 2017), vol. 10696, 2018 (hereafter "Arlazarov"), and "On optimal stopping strategies for text recognition in a video stream as an application of a monotone sequential decision model," Bulatov et al., Int'l Journal on Document Analysis and Recognition, vol. 22, no. 3, pp. 303-14, 2019 (hereafter "Bulatov$_2$"), which are both hereby incorporated herein by reference as if set forth in full. The method in Arlazarov clusters the sequence of input results, and makes the stopping decision based on the statistical characteristics of the obtained clusters. The method in Bulatov$_2$ models the next combined result, and makes the stopping decision based on an estimate of the expected distance between the current combined result and the next combined result.

The Bulatov$_2$ method was tested on text-recognition results using both Levenshtein-based and end-to-end text-string distance metrics. The Bulatov$_2$ method exhibited higher effectiveness than the cluster-analysis method of Arlazarov. The Bulatov$_2$ method was also tested using a text-recognition result model with per-character class membership estimations. This proved to be more effective than other methods, as demonstrated in "Next integrated result modelling for stopping the text field recognition process in a video using a result model with per-character alternatives," Bulatov et al., SPIE 12th ICMV 2019, vol. 11433, pp. 710-6, doi:10.1117/12.2559447, 2020 (hereafter "Bulatov$_3$"), which is hereby incorporated herein by reference as if set forth in full.

The related works only considered the accuracy characteristics of the combined result and the achieved mean number of processed image frames. They failed to consider the time required to compute the necessary estimations on which the stopping determination was based. In particular, the Bulatov$_2$ method of modeling the combined result at the next stage has a high computational complexity, which could diminish the positive effect of the stopping method, especially if executed in real time on a mobile device.

Thus, in an embodiment, the disclosed stopping method constructs an approximate model of the next combined result, in order to utilize the stopping decision of the Bulatov$_2$ method, but with reduced computational complexity. Otherwise, embodiments may utilize the Bulatov$_2$ method for stopping the video-stream recognition process, with the per-character alternatives from Bulatov$_3$. The individual per-frame text-recognition results of a text string may be combined using the algorithm described in Bulatov$_1$.

A text-recognition result X for a string, with per-character alternatives, can be represented as a matrix:

$$X = (x_{jk}) \in [0.0, 1.0]^{M \times K}, \forall j \sum_{k=1}^{K} x_{jk} = 1.0, \quad (1)$$

wherein M is the length of the string (i.e., the number of characters in the string), and K is the number of character classes. Each row $(x_{j1}, x_{j2}, \ldots, x_{jK})$ of the matrix represents the classification result for an individual character in the string, and comprises the membership estimations for that character for each character class. The value of each membership estimation is a real number in the range [0.0, 0.1], and the sum of all membership estimations in the classification result for each individual character in the string is equal to 1.0. The combined recognition result of the string in a video stream may be represented with the same data structure.

During the video-stream recognition process, the text-recognition module will produce a sequence of text recognition results $X_1, X_2, \ldots$, representing the text-recognition results for a string in each image frame. Each text-recognition result represents a stage in the video-stream recognition process. The goal of the video-stream recognition process is to produce a combined result for all of the image frames, which has the highest accuracy and is as close as possible to the correct string value X* in terms of some predefined metric. In a more general case, there may also be a non-negative weight $w_i$ associated with each frame's text-recognition result $X_i$. Weight $w_i$ represents the contribution of the result $X_i$, for an image frame, to the combined result for the video stream.

In stage n, the text-recognition result $X_n$ is observed and combined with the previously accumulated recognition result $R_{n-1}$ as follows:

(1) Each character classification result (e.g., each row in $X_n$) is expanded to add an "empty" class λ with a membership estimation value of 0.0. This corresponds to adding a zero-valued column at the beginning of the matrix $X_n$.

(2) A character alignment is calculated between the current text-recognition result $X_n$ and the currently accumulated or combined result $R_{n-1}$. This alignment may utilize a dynamic programming procedure to determine the optimal matching between rows in $X_n$ and the rows in $R_{n-1}$.

(3) After the character alignment, the corresponding character classification results (i.e., between the current text-recognition result $X_n$ and the currently accumulated or combined result $R_{n-1}$) are combined. For example, corresponding character classification results may be combined by calculating a weighted average of membership estimations for each class. The empty class λ may be used to pair a character that is not aligned with any other character. For example, the character classification result for the character may be paired with a character classification result having a membership estimation of 1.0 for the empty class λ (and 0.0 for every other class).

Figure 4:
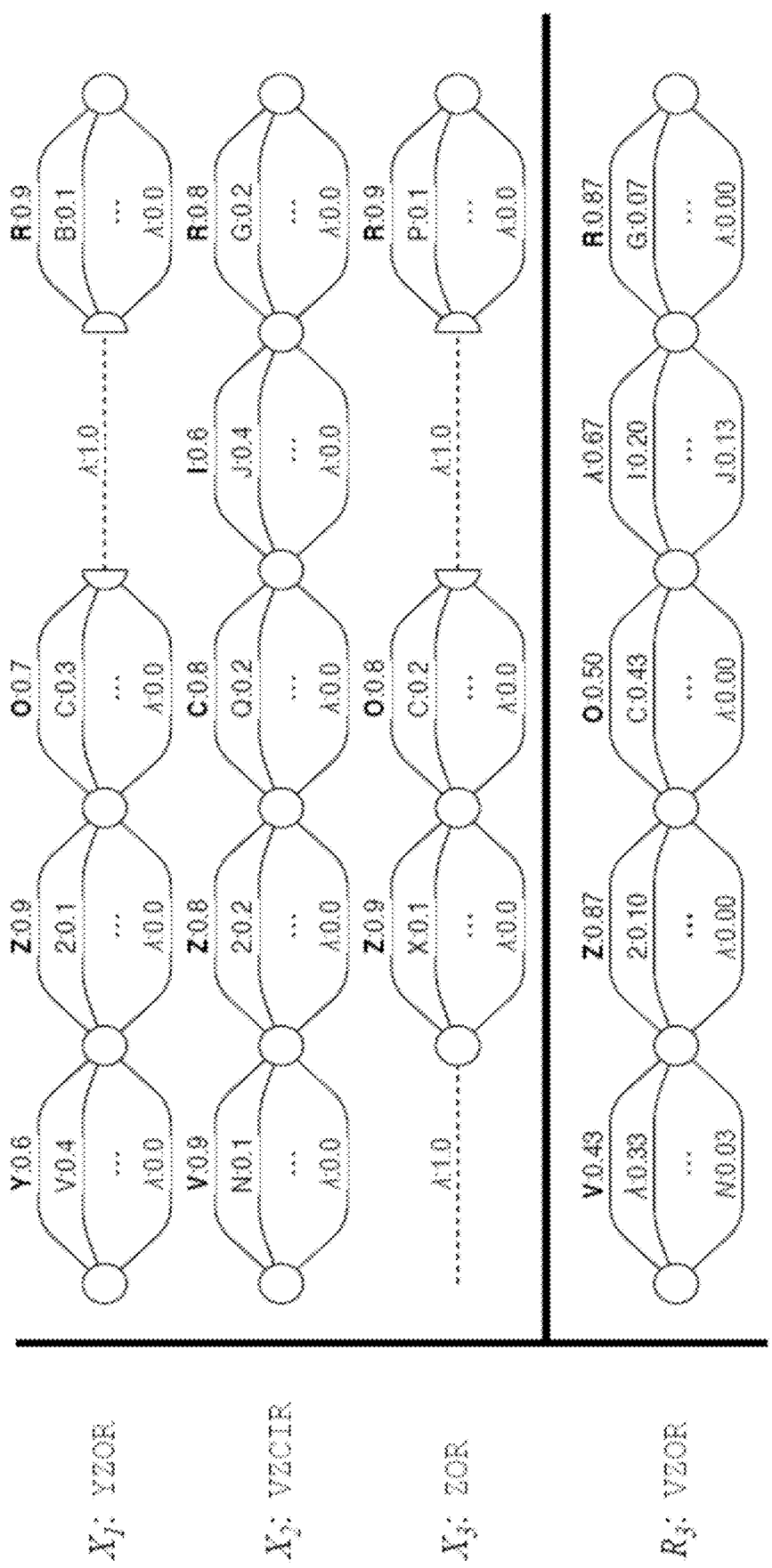
FIG. 4 illustrates an example alignment for combining text-recognition results, according to an embodiment.

FIG. 4 illustrates an example alignment with combined result $R_3$ for three text-recognition results $X_1$, $X_2$, and $X_3$, from three image frames of a video of a text string, according to an embodiment. For ease of visual representation, each frame result is represented as a weighted identity transducer (see, e.g., "OCR post-processing using weighted finite-state transducers," Llobet et al., 20th Int'l Conference on Pattern Recognition, pp. 2021-4, 2010, which is hereby incorporated herein by reference as if set forth in full), with each character classification result corresponding to a set of labeled transitions between two consequent states.

After $X_n$ and the current combined result $R_{n-1}$ are combined to produce an accumulated result $R_n$ for a stage n, the stopping method is applied to make a decision as to whether $R_n$ should be returned as the final result or the process should continue (i.e., whether the observation $X_{n+1}$ should be acquired in a next stage n+1). The stopping method in Bulatov$_2$ operates under the assumption that the expected distances between two consecutive combined results, $R_{n-1}$ and $R_n$, do not increase from stage to stage. Using this assumption, the stopping problem can be viewed as a monotone stopping problem—at least starting from a certain stage. An optimal stopping rule should behave in a "myopic" way (i.e., making the decision as if the next stage of the video-stream recognition process will be the final stage). To approximate an optimal stopping rule in stage n, the expected distance is calculated from the current combined result $R_n$ to the next combined result $R_{n+1}$. The video-stream recognition process is stopped if the expected distance between $R_n$ and $R_{n+1}$ does not exceed a predefined threshold that represents the cost of each observation X.

Figure 5:
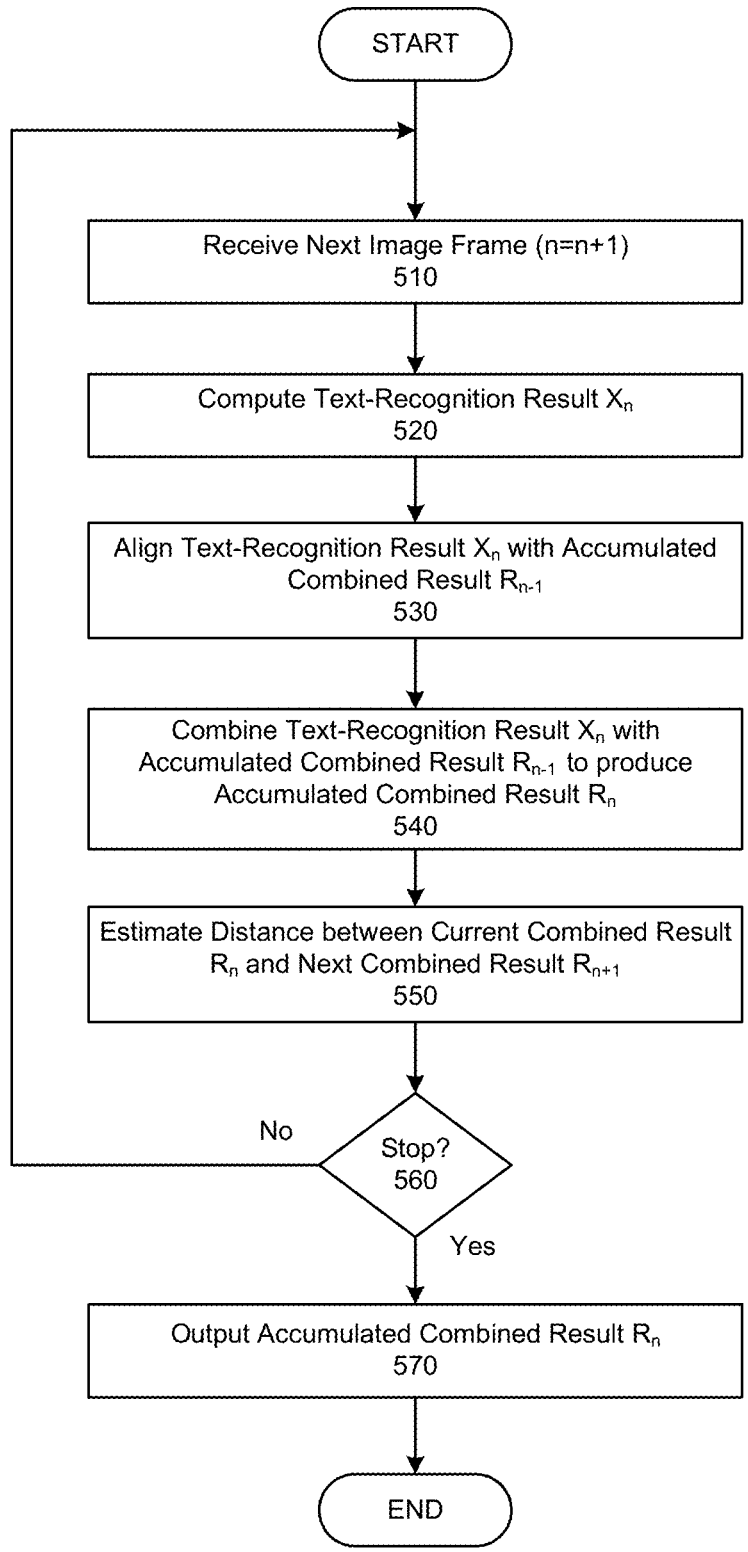
FIG. 5 illustrates a text-recognition process, according to an embodiment.

FIG. 5 illustrates a text-recognition process 500, according to an embodiment. Process 500 may be implemented by the text-recognition module as subprocesses 310 and 320 of process 300 in FIG. 3.

In subprocess 510, the next image frame is received from a video. The image frame may be received in real time or near-real time, as the video is captured (e.g., on a mobile device). The image frame may be pre-processed prior to subsequent subprocesses, for example, by being cropped, de-warped, de-skewed, sharpened, and/or the like.

In subprocess 520, a text-recognition result $X_n$ is computed from the image frame. Text-recognition result $X_n$ may be computed in any known manner to produce a matrix of class estimations $(x_{j1}, x_{j2}, \ldots, x_{jK})$ for each character detected in the image frame. The class estimations for each character may be referred to herein as a character classification result or a vector of class estimations. These character classification results or vectors may be arranged in a matrix, such that each row represents a single character position in a text field and each column represents an estimation for a single class from among all possible classes (including an "empty" class k). Alternatively, the matrix could be reversed such that each row represents a single class and each column represents a single character position.

In subprocess 530, the text-recognition result $X_n$ is aligned with the current accumulated combined result $R_{n-1}$. In other words, the positions of characters in $X_n$ are aligned with the corresponding positions of characters in $R_{n-1}$. In an embodiment, when a character in $X_n$ has no corresponding character in $R_{n-1}$, a character representing the "empty" class λ may be added at the corresponding position in $R_{n-1}$ for the combination. Similarly, when a character in $R_{n-1}$ has no corresponding character in $X_n$, a character representing the "empty" class λ may be added at the corresponding position in $X_n$ for the combination.

In subprocess 540, the text-recognition result $X_n$ is combined with the accumulated combined result $R_{n-1}$. For example, corresponding character classification results may be combined by calculating a weighted average of membership estimations for each class to produce the new accumulated combined result $R_n$.

In subprocess 550, an estimated distance, between the current combined result $R_n$ and the next combined result $R_{n+1}$, is calculated. As discussed elsewhere herein, the estimated distance may be calculated based on disclosed approximations to reduce computational complexity without sacrificing accuracy.

Subprocess 560 represents the stopping decision in text-recognition process 500. Subprocess 560 determines whether or not to stop the video-stream recognition process based on the distance estimated in subprocess 550. For example, if the distance is below a threshold, process 500 may decide to stop the video-stream recognition process (i.e., "Yes" in subprocess 560), since the marginal benefit to accuracy of continuing is not worth the additional computational expense. Otherwise, if the distance is above the threshold, process 500 may decide to continue the video-stream recognition process (i.e., "No" in subprocess 560), since the marginal benefit to accuracy of continuing is worth the additional computational expense. It should be understood that, if the distance is equal to the threshold, the decision may be made to stop or continue, depending on design choice.

If the decision is to continue the video-stream recognition process (i.e., "No" in subprocess 560), process 500 returns to step 510 to receive (e.g., capture) a new image frame. Otherwise, if the decision is to stop the video-stream recognition process (i.e., "Yes" in subprocess 560), the accumulated combined result $R_n$ is output as the final combined result R in subprocess 570, and process 500 ends. It should be understood that a character string, representing the recognized text in the video stream, may be derived from the class estimations in the final combined result R. This character string may represent the final output of the text-recognition module.

The expected distance, from the current accumulated result $R_n$ to the next combined result $R_{n+1}$, may be calculated (e.g., in subprocess 550) by modeling the next combined result $R_{n+1}$. Specifically, the next combined result $R_{n+1}$ may be modeled by sampling already accumulated observations $X_i$ as candidates for the next observation $X_{n+1}$, as follows:

$$\hat{\Delta}_n = \frac{1}{n+1}\left(\delta + \sum_{i=1}^{n} \rho(R_n, R(X_1, \ldots, X_n, X_i))\right), \quad (2)$$

wherein n is the stage number, δ is an external parameter, ρ is a metric function defined on the set of text-recognition results, $R_n$ is the combined result obtained on the n-th stage, and $R(X_1, \ldots, X_n, X_i)$ is the combined result obtained by testing the text-recognition result $X_i$ for an individual image frame as a candidate for the next observation.

For the validity of the Bulatov$_2$ method, any metric function ρ can be used to measure the distance between text-recognition results, provided that it satisfies the triangle inequality. In an embodiment, a normalized version of the Generalized Levenshtein Distance (GLD) may be used as metric function ρ. GLD is described in "A normalized Levenshtein distance metric," Yujian et al., IEEE Transactions on Pattern Analysis and Machine Intelligence, vol. 29, no. 6, pp. 1091-5, 2007, which is hereby incorporated herein by reference as if set forth in full. To calculate GLD, a metric $\rho_C$ is defined on the set of individual character classification results (i.e., on individual rows of the matrices to be compared). For this purpose, a scaled taxicab metric may be used:

$$\rho_C(a, b) = \frac{1}{2}\sum_{k=0}^{K}|a_k - b_k|, \quad (3)$$

wherein a and b are two matrix rows, $a_0$ and $b_0$ are the respective member estimations for the empty class λ, and $a_{k\neq 0}$ and $b_{k\neq 0}$ are the respective member estimations for all non-empty character classes (e.g., classes in the alphabet) for all k>0.

This stopping method was tested on text-recognition results without member estimations, using Recognizer Output Voting Error Reduction (ROVER) as the combination algorithm (e.g., in subprocess 540). ROVER is described in "A post-processing system to yield reduced word error rates: Recognizer Output Voting Error Reduction (ROVER)," Fiscus, IEEE Workshop on Automatic Speech Recognition and Understanding, pp. 347-54, 1997, which is hereby incorporated herein by reference as if set forth in full. It was also tested with another per-frame recognition method and an extended text-recognition result model using a combination algorithm based on the ROVER approach. Both tests demonstrated that, given an average number of processed image frames, the disclosed approach lowered the error level.

However, a downside of this stopping method is the complexity of the decision-making algorithm, and, in particular, the time required to compute the expected distance estimation $\hat{\Delta}_n$ (e.g., in subprocess 550). Given two text-recognition results X and Y with lengths |X| and |Y|, the computational complexity of their combination using the algorithm in Bulatov$_1$ is O(|X|·|Y|·K), since the alignment procedure requires O(|X|·|Y|) calculations of the individual character classification metric $\rho_C$. For the same reason, the complexity of calculating GLD ρ(X, Y) is also O(|X|·|Y|·K). Consider M as the maximum length of individual text-recognition results $X_i$ in terms of the number of rows, and $S_n$ as the length of combined result $R_n$ in terms of the number of rows. The complexity of performing each test combination that is required to compute the sum for $\hat{\Delta}_n$ is O($S_n$MK), and the worst-case estimation for the length of the next combined result candidate is $O(S_n+K)$. Thus, to compute the distance from the current combined result $R_n$ to the next combined result $R_{n+1}$, another $O(S_nK(S_n+M))$ operations must be performed. The total aggregate computational complexity of computing the expected distance estimation $\hat{\Delta}_n$ in stage n is $O(nS_nK(S_n+M))$.

2.2.2. Approximations

Thus, in an embodiment, to reduce this computational complexity, approximations are introduced to compute the value of the distance estimation more efficiently. Specifically, one or both of the following approximations may be used:

Approximation 1: naïve alignment. During testing of the combined result $R(X_1, \ldots, X_n, X_i)$, the candidate text-recognition result $X_i$ for an image frame has to be aligned with $R_n$. However, $R_n$ already contains $X_i$, since it was previously aligned with in the i-th stage of the video-stream recognition process. Thus, as an approximation of this alignment, it is assumed that rows of $X_i$ will be aligned with the same rows of $R_n$ with which the corresponding components were combined in stage i. This coarse assumption enables the costly alignment to be skipped for each tested combination, since the alignment of the row indices of $R_n$ with the row indices of $X_i$ are already known.

Approximation 2: naïve Levenshtein. Given Approximation 1, the length of the combined result $R(X_1, \ldots, X_n, X_i)$ is the same as the length of $R_n$. It is assumed that the alignment of $R_n$ with $R(X_1, \ldots, X_n, X_i)$, which is required to compute the GLD between them, is direct. In other words, it is assumed that each j-th row of $R_n$ is aligned with the j-th row of $R(X_1, \ldots, X_n, X_i)$. Thus, the distance between $R_n$ and $R(X_1, \ldots, X_n, X_i)$ is a sum of distances, in terms of the scaled taxicab metric $\rho_C$, between each row in $R_n$ and each row in $R(X_1, \ldots, X_n, X_i)$ with the same index.

In an embodiment, to quickly compute the approximate value of an expected distance estimation $\hat{\Delta}_n$, during the combination of per-frame text-recognition results $X_1, X_2, \ldots$, a three-dimensional matrix $Y_n$ is maintained and updated:

$$Y_n = (y_{ijk}) \in [0.0, 1.0]^{\times S_n \times (K+1)}, \quad (4)$$

wherein i is the index into per-frame text-recognition results of the input image frames, j is the index of a row in the current combined result $R_n$, k is the character class index, $y_{ijk}$ is a membership estimation of class k from a row of input $X_i$ that was aligned and merged into the j-th row of the current combined result $R_n$.

Given Approximations 1 and 2 above, and using GLD as the metric function ρ, for the j-th component of the combined result $R_n$ and for each individual character class index $k \in \{0, 1, \ldots, K\}$ (in which k=0 is the index of the empty class label λ), consideration of $X_i$ as a candidate for the next per-frame text-recognition result adds the following contribution to the sum of distances in $\hat{\Delta}_n$:

$$\Delta_{ijk} = \frac{1}{2}\left|\frac{A_{jk}}{W} - \frac{A_{jk}+y_{ijk}w_i}{W+w_i}\right|, \quad (5)$$

wherein $w_i$ is the weight associated with per-frame text-recognition result $X_i$, $A_{jk}$ is the weighted sum of membership estimations of class k corresponding to the j-th component of the combined result (i.e., $A_{jk}=\Sigma^n_{i=1} y_{ijk}w_i$), and W is the sum of all of the weights (i.e., $W=\Sigma^n_{i=1} w_i$).

Thus, the expected distance estimation $\hat{\Delta}_n$ can be approximated as follows:

$$\hat{\Delta}_n \approx \frac{1}{n+1}\left(\delta + \sum_{i=1}^{n}\sum_{j=1}^{S_n}\sum_{k=0}^{K}\Delta_{ijk}\right) \quad (6)$$

Since the weighted sum $A_{jk}$ of membership estimations can be computed for all j and k, on the fly, during the combination of $X_n$ and $R_{n-1}$, the approximate estimation $\hat{\Delta}_n$ above can be computed with complexity $O(nS_nK)$.

2.2.3. Unweighted Case

If there are no weights $w_i$ associated with any of the text-recognition results $X_i$, all of the text-recognition results $X_i$ will contribute equally to the final combined result R. In this case, $\Delta_{ijk}$ can be further simplified to:

$$\Delta_{ijk} = \frac{1}{2}\left|\frac{A_{jk}}{n} - \frac{A_{jk}+y_{ijk}}{n+1}\right| = \frac{|A_{jk}-n\cdot y_{ijk}|}{2n(n+1)} \quad (7)$$

If the values of $A_{jk}$ are precalculated, the three sums in the approximate estimation scheme for $\hat{\Delta}_n$ are independent. Thus, the higher level summation across the input sequence can be brought to the lowest level. The sum $\Sigma^n_{i=1}\Delta_{ijk}$ can then be computed with complexity lower than $O(n)$. Consider $L_{jk} \cup \{1, 2, \ldots, n\}$ as a subset of indices, such that $\forall i \in L_{jk}: n \cdot y_{ijk} < A_{jk}$. Let $B_{jk}$ denote the sum of elements with such indices, i.e., $B_{jk}=\Sigma_{i \in L_{jk}} y_{ijk}$. By performing separate summations across indices in $L_{jk}$, the absolute value bars can be removed from the expression, as follows:

$$\sum_{i=1}^{n}\Delta_{ijk} = \frac{1}{2n(n+1)}\sum_{i=1}^{n}|A_{jk}-n\cdot y_{ijk}| \quad (8)$$

$$= \frac{1}{2n(n+1)}(|L_{jk}|\cdot A_{jk} - n\cdot B_{jk} + n\cdot(A_{jk}-B_{jk}) - A_{jk}\cdot(n-|L_{jk}|))$$

$$= \frac{1}{n(n+1)}(A_{jk}\cdot|L_{jk}| - n\cdot B_{jk})$$

To efficiently compute this expression, the values of $|L_{jk}|$ and $B_{jk}$ should be capable of being quickly calculated for each j and k. In an embodiment, to accomplish this, a data structure is set up for $y_{1jk}, y_{2jk}, \ldots, y_{njk}$ that supports fast insertion—which is required when $Y_{n-1}$ is updated to incorporate $X_n$ to produce $Y_n$—and fast computation of the quantity $|L_{jk}|$ and sum $B_{jk}$ of elements (i.e., lower than the average). This data structure may comprise one or more balanced binary search trees, such as treaps, described in "Fast set operations using treaps," Blelloch et al., Proc. of the 10th Annual ACM Symposium on Parallel Algorithms and Architectures, pp. 16-26, doi.acm.org/10.1145/277651.277660, 1998, which is hereby incorporated herein by reference as if set forth in full. Treaps require $O(\log n)$ operations for both insertion and queries. This reduces the complexity of computing the approximate expected distance estimation $\Delta_{ijk}$ to $O(S_nK \log n)$.

For large values of n, this computation scheme is significantly more efficient than the direct summation in Equation 6. However, for small values of n, this computation scheme could be impractical to implement, due to high computational overhead, relative to the number of elements in each binary search tree.

2.2.4. Using a Normalized GLD

Embodiments of the optimizations discussed above may utilize GLD as the metric function ρ for distance. The normalized version of GLD, discussed in Yujian et al., may be used to measure a character-level recognition error rate for Bulatov$_2$ and Bulatov$_3$. The normalized GLD produces values in the range [0.0, 1.0], and satisfied triangle inequality. It is defined as follows:

$$nGLD(X, Y) = \frac{2 \cdot GLD(X, Y)}{GLD(X, Y) + \alpha \cdot (|X| + |Y|)}, \quad (9)$$

wherein α is the maximum component-wise distance between empty and non-empty characters. With a scaled taxicab metric $\rho_C$, the value of α is 1.

If the approximation of the expected distance $\hat{\Delta}_n$ is calculated directly using the computation scheme of Equation 6, the two internal sums in Equation 6 compute the approximation of GLD between $R_n$ and $R(X_1, \ldots, X_n, X_i)$. Thus, if a normalized version of GLD is used as the metric function ρ, each computed GLD can then be normalized under the higher level sum sign.

However, to apply the further optimization of Equation 8 for unweighted cases, an additional assumption should be allowed to convert the computed summation of GLD values to a sum of normalized GLD values. $G_n$ denotes the sum of GLD between the current combined result $R_n$ and the modeled candidates for the next combined result. In other words, $G_n = \sum_{i=1}^{n} GLD(R_n, R(X_1, \ldots X_n, X_i))$. In order to apply the optimization of Equation 8, the following approximation can be introduced:

Approximation 3: naïve normalization. The GLD constituents of $G_n$ may be normalized after summation. Given Approximation 1 (i.e., naïve alignment), the lengths of $R_n$ and $R(X_1, \ldots, X_n, X_i)$ are both equal to $S_n$. Thus, Approximation 3 can be expressed as:

$$\sum_{i=1}^{n} nGLD(R_n, R(X_1, \ldots, X_n, X_i)) \approx \frac{2G_n}{G_n + 2S_n} \quad (10)$$

Given Approximation 2 (i.e., naïve Levenshtein), the value of $GLD(R_n, R(X_1, \ldots, X_n, X_i))$ is not higher than $S_n$. Thus, Approximation 3 essentially relies on an assumption of local linearity of function $f(t) = (2t)/(t+2)$ in the range $t \in [0.0, 1.0]$. Using the optimization of Equation 8 and balanced binary search trees (e.g., treaps), the approximation of $G_n$ can be efficiently computed. Then, using the approximation Equation 10, the approximation of $G_n$ can be converted to a sum of the normalized GLD between the current combined result $R_n$ and the modeled candidates for the next combined result that are required to compute the estimation $\hat{\Delta}_n$.

3. Experimental Evaluation

The results of an experimental evaluation of the disclosed optimization against the direct application of the method in Bulatov$_3$ will now be described. The open Mobile Identity Document Video (MIDV) 500 and MIDV-2019 datasets were used to evaluate the methods. These datasets provide ground truth in the form of coordinates of the document in each image frame, along with coordinates of each text field in each unique document and the correct value for each of those text fields.

The experimental setting closely followed the setting described in Bulatov$_3$ (but which only utilized MIDV-500), in order to provide a just comparison of the methods. As in Bulatov$_3$, only image frames which fully contained the boundaries of a document were considered. To avoid normalization effects, videos that were under thirty seconds in length were looped, so that all videos had a common length of thirty seconds. Using the ground truth provided with the datasets, the text fields were cropped with a resolution of 300 dots per inch (DPI) and margins equal to 30% of the smallest side of the text field bounding box.

Four groups of text fields were analyzed: document numbers, numerical dates, name components written in the Latin alphabet, and machine-readable zone lines. In total, there were 248 unique text fields from 2,239 evaluated videos in the MIDV-500 dataset and 992 videos in the MIDV-2019 dataset. Each image of a text field was recognized using a text-string recognition subsystem of the Smart IDReader document recognition solution, as described in "Two-Step CNN Framework for Text Line Recognition in Camera-Captured Images," Chernyshova et al., IEEE Access, vol. 8, pp. 32587-600, doi:10.1109/ACCESS.2020.2974051, 2020, which is hereby incorporated herein by reference as if set forth in full. Thus, text-recognition results were obtained in the form of Equation 1. The algorithm described in Bulatov$_1$ was used to combine the text-recognition results without weights, and a normalized GLD was used as the metric function ρ to estimate the distance between text-recognition results. The value of parameter δ in the expected distance estimation of Equation 2 was set to 0.1.

In each experiment, three methods were evaluated:

(1) Base Method, as described in Bulatov$_3$. The estimation value $\hat{\Delta}_n$ was computed using the direct modeling in Equation 2. The complexity for computing estimation value $\hat{\Delta}_n$ in stage n is $O(nS_n K(S_n + M))$.

(2) Method A. The estimation value $\hat{\Delta}_n$ was computed using the approximate modeling with the direct summation of Equation 6 and with $\Delta_{ijk}$ computed using the simplified expression in Equation 7 for the unweighted case. The complexity computing estimation value $\hat{\Delta}_n$ in stage n is $O(nS_n K)$.

(3) Method B. The estimation value $\hat{\Delta}_n$ was computed using the approximate modeling with the optimized summation scheme of Equation 8 and with balanced binary search trees. Conversion to normalized GLD was performed using Approximation 3 (i.e., naïve normalization), represented by Equation 10. Treaps with random priorities, as described in Blelloch et al., were used as the balanced binary search trees, due to the simplicity of implementation. The complexity for computing estimation value $\hat{\Delta}_n$ in stage n is $O(S_n K \log n)$.

In the first experiment, the value of the estimated expected distance $\hat{\Delta}_n$ from the current combined result was compared to the possible combined result in the next stage. FIG. 6 is a plot of the mean estimation value $\hat{\Delta}_n$ calculated in each simulation stage, for each evaluated method, for the MIDV-500 dataset. On average, the estimation value $\hat{\Delta}_n$ calculated by Method A is equal to the estimation value $\hat{\Delta}_n$ calculated by the full model in the Base Method. This demonstrates that Approximation 1 (i.e., naïve alignment) and Approximation 2 (i.e., naïve Levenshtein) are justified for efficient approximate computation of the expected distance estimation. The approximation error of Method B is an effect of the naïve normalization.

In the second experiment, to evaluate the computational performance of the proposed approximations, the combined time required to produce the result $R_n$ and calculate the expected distance estimation $\hat{\Delta}_n$ from the current combined result $R_n$ to the next result $R_{n+1}$ were compared across the evaluated methods. The time required to produce the result $R_n$ was included in the compared times, since the disclosed methods involve on-the-fly modifications of some internal structures while combining results. The table below provides the time required to construct the combined result and calculate the expected distance estimation for each of the three methods:

| Method | Time in stage n (in seconds) | | | | |
| --- | --- | --- | --- | --- | --- |
| | n = 5 | n = 10 | n = 15 | n = 20 | n = 25 |
| Base Method | 0.206 | 0.402 | 0.605 | 0.807 | 1.014 |
| Method A | 0.020 | 0.021 | 0.021 | 0.022 | 0.022 |
| Method B | 0.025 | 0.028 | 0.029 | 0.030 | 0.031 |

In addition, FIG. 7 is a plot of the time required to construct the combined result $R_n$ and calculate distance estimation $\hat{\Delta}_n$ in each simulation stage, for each evaluated method, for the MIDV-500 dataset. Measurements were performed for an implementation of a single-thread Python™ prototype that was executed on a personal computer (e.g., Python™ 3.7.4 under Jupyter™ 6.0.1, on an AMD™ Ryzen™ 7 2700 CPU, with 32 Gb RAM). FIG. 7 and the table above demonstrate that approximate computation of the distance estimation $\hat{\Delta}_n$ allows the stopping decision to be made much quicker in comparison to direct modeling. In addition, the increase in required computations from stage to stage is negligible in Methods A and B. As discussed above, the difference, between the direct summation in Method A and the optimized summation scheme of Equation 8 with balanced search trees in Method B, is insignificant. However, Method B is slightly less computationally efficient that Method A, due to the data structure overhead.

In the third experiment, the performance of the resulting stopping methods were compared across the evaluated methods. A "good" stopping method should be able to achieve a lower error level given a fixed mean number of processed image frames, or achieve a lower mean number of processed image frames given a fixed mean error level. A convenient method of comparing stopping methods is to compare their expected performance profiles, as used for analysis of anytime algorithms. See, e.g., "Using anytime algorithms in intelligent systems," Zilberstein, AI Magazine, vol. 17, no. 3, pp. 73-83, 1996, which is hereby incorporated herein by reference as if set forth in full. The performance profile can be obtained by plotting the mean error level (e.g., in terms of distance from the obtained combined result to the correct combined result) of the combined result at the stopping stage to the mean number of processed image frames (i.e., stage) before stopping, while varying the observation cost value. A lower position of the plotted curve indicates greater performance of the stopping method. The observation cost for the evaluated methods corresponds to the threshold, with which the distance estimation $\hat{\Delta}_n$ is compared, when making the stopping decision.

Figure 8A:
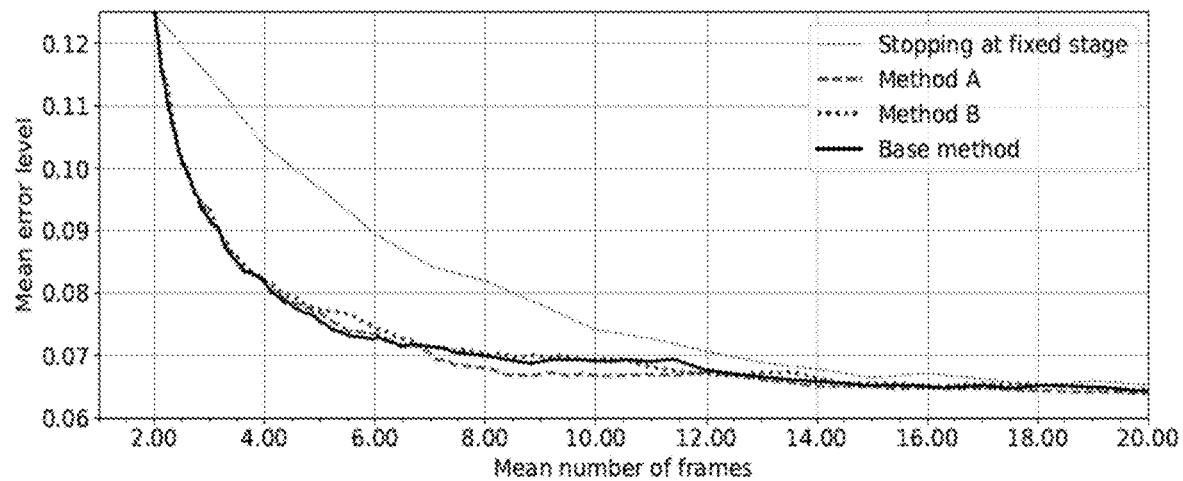
FIGS. 8A and 8B illustrate performance profiles, according to experimental evaluations of embodiments of disclosed methods.
Figure 8B:
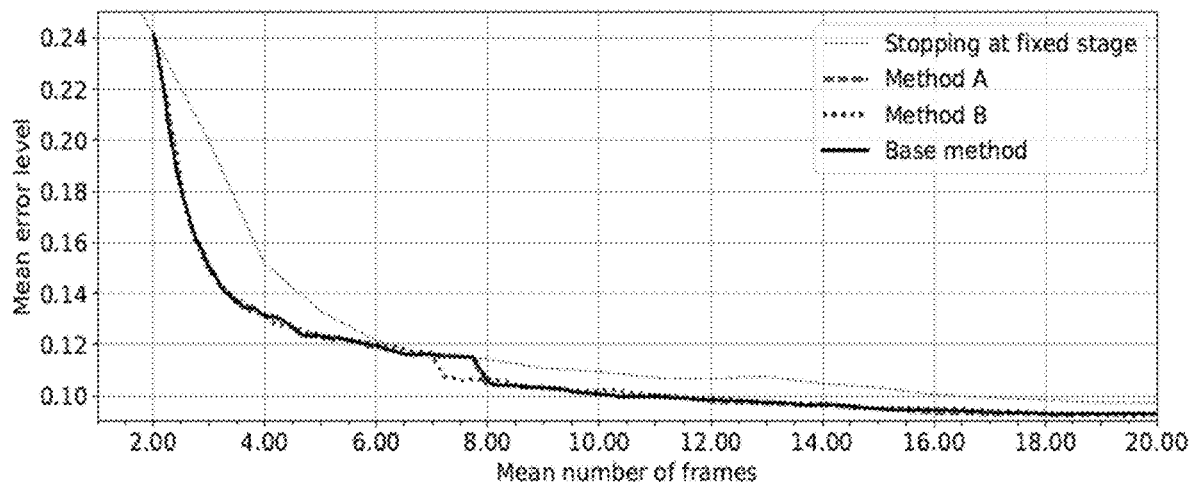

FIGS. 8A and 8B illustrate the expected performance profiles of the three evaluated methods, as well as a baseline stopping method that stops the video-stream recognition process after a fixed stage. The MIDV-500 dataset was used for the plot in FIG. 8A, and the MIDV-2019 dataset was used for the plot in FIG. 8B. The varied parameter for the baseline stopping method was the number of the stage on which it should stop. FIGS. 8A and 8B demonstrate that the approximations in Methods A and B had almost no effect on the performance of the stopping method in terms of the achieved error level and required number of observations. With respect to the MIDV-500 dataset, Method B had a slight disadvantage against Method A, which could be an effect of utilizing Approximation 3 (i.e., naïve normalization, for example, using a normalized GLD as a metric function ρ). Given the significant advantage in computational performance, the disclosed approximate modeling (e.g., in Method A or B) is more favorable for stopping the text-recognition process in a video stream than prior methods (e.g., the Base Method).

4. Example Embodiment

In an embodiment, the text-recognition module determines when to stop a text-recognition process, for text fields in a video stream of a document, in which text recognition is performed on each image frame of the video independently with the results combined together, using one or more of the disclosed approximations and assumptions. These approximations and assumptions enable an optimized computation scheme for the stopping decision with reduced computational complexity. Experimental evaluations demonstrate that the optimized computation scheme dramatically reduces the time required to make the stopping decision, without diminishing the quality of the stopping method in terms of the precision of the achieved combined result.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:
1. A method comprising using at least one hardware processor to:
    until a determination to stop processing is made, for each of a plurality of image frames in a video stream, receive the image frame,
generate a text-recognition result from the image frame, wherein the text-recognition result comprises a vector of class estimations for each of one or more characters,
combine the text-recognition result with an accumulated text-recognition result,
estimate a distance between the accumulated text-recognition result and a next accumulated text-recognition result based on an approximate model of the next accumulated text-recognition result, wherein the distance between the accumulated text-recognition result and the next accumulated text-recognition result is estimated as $$\hat{\Delta}_n = \frac{1}{n+1}\left(\delta + \sum_{i=1}^{n}\sum_{j=1}^{S_n}\sum_{k=0}^{K}\Delta_{ijk}\right)$$

wherein $\hat{\Delta}_n$ is the estimated distance,
wherein n is a current number of image frames for which text-recognition results have been combined with the accumulated text-recognition result,
wherein $\delta$ is an external parameter,
wherein $S_n$ is a number of vectors of class estimations in the accumulated text-recognition result,
wherein K is a number of classes represented in each vector of class estimations in the accumulated text-recognition result, and
wherein $\Delta_{ijk}$ is a contribution to the estimated distance by a class estimation for a k-th class to a j-th component of the accumulated text-recognition result from the vector of class estimations in the text-recognition result generated from an i-th image frame, and
determine whether or not to stop the processing based on the estimated distance; and,
after stopping the processing, output a character string based on the accumulated text-recognition result.

2. The method of claim 1, wherein $\Delta_{ijk}$ is calculated as:

$$\Delta_{ijk} = \frac{1}{2}\left|\frac{A_{jk}}{W} - \frac{A_{jk} + y_{ijk}w_i}{W + w_i}\right|,$$

wherein $A_{jk}$ is a weighted sum of class estimations for the k-th class corresponding to the j-th component of the accumulated text-recognition result,
wherein $y_{ijk}$ is a class estimation for the k-th class that was merged into the j-th component of the accumulated text-recognition result from the vector of class estimations in the text-recognition result generated from the i-th image frame,
wherein $w_i$ is a weight associated with the text-recognition result generated from the i-th image frame, and
wherein W is a sum of all weights $w_i$.

3. The method of claim 1, wherein $\Delta_{ijk}$ is calculated as:

$$\Delta_{ijk} = \frac{|A_{jk} - n\cdot y_{ijk}|}{2n(n+1)},$$

wherein $A_{jk}$ is a sum of class estimations for the k-th class corresponding to the j-th component of the accumulated text-recognition result, and
wherein $y_{ijk}$ is a class estimation for the k-th class that was merged into the j-th component of the accumulated text-recognition result from the vector of class estimations in the text-recognition result generated from the i-th image frame.

4. The method of claim 1, wherein $\Sigma_{i=1}^{n}\Delta_{ijk}$ is calculated as:

$$\sum_{i=1}^{n}\Delta_{ijk} = \frac{1}{n(n+1)}(A_{jk}\cdot|L_{jk}| - n\cdot B_{jk}),$$

$L_{jk} \subset \{1, 2, \ldots, n\}$, such that $\forall i \in L_{jk}: n\cdot y_{ijk} < A_{jk}$, $B_{jk} = \sum_{i\in L_{jk}} y_{ijk},$ wherein $A_{jk}$ is a sum of class estimations for the k-th class corresponding to the j-th component of the accumulated text-recognition result, and
wherein $y_{ijk}$ is a class estimation for the k-th class that was merged into the j-th component of the accumulated text-recognition result from the vector of class estimations in the text-recognition result generated from the i-th image frame.

5. The method of claim 4, wherein values of $y_{ijk}$ are stored in one or more balanced binary search trees.

6. A method comprising using at least one hardware processor to:
until a determination to stop processing is made, for each of a plurality of image frames in a video stream,
receive the image frame,
generate a text-recognition result from the image frame, wherein the text-recognition result comprises a vector of class estimations for each of one or more characters,
combine the text-recognition result with an accumulated text-recognition result,
estimate a distance between the accumulated text-recognition result and a next accumulated text-recognition result based on an approximate model of the next accumulated text-recognition result, wherein estimating the distance between the accumulated text-recognition result and the next accumulated text-recognition result comprises, for each previous text-recognition result, calculating a distance between the accumulated text-recognition result and a combination of the accumulated text-recognition result with the previous text-recognition result, and wherein the distance between the accumulated text-recognition result and the next accumulated text-recognition result is estimated as $$\hat{\Delta}_n = \frac{1}{n+1}\left(\delta + \sum_{i=1}^{n}\rho(R_n, R(X_1, \ldots, X_n, X_i))\right),$$

wherein $\hat{\Delta}_n$ is the estimated distance,
wherein n is a current number of image frames for which text-recognition results have been combined with the accumulated text-recognition result, wherein δ is an external parameter,
wherein ρ is a distance metric function,
wherein $R_n$ is the accumulated text-recognition result, and
wherein $R(X_1, \ldots, X_n, X_i)$ is a combination of all text-recognition results, that have been previously combined to form the accumulated text-recognition result, with a text-recognition result from an i-th image frame, and
determine whether or not to stop the processing based on the estimated distance; and,
after stopping the processing, output a character string based on the accumulated text-recognition result.

7. A method comprising using at least one hardware processor to:
until a determination to stop processing is made, for each of a plurality of image frames in a video stream,
receive the image frame,
generate a text-recognition result from the image frame, wherein the text-recognition result comprises a vector of class estimations for each of one or more characters,
combine the text-recognition result with an accumulated text-recognition result,
estimate a distance between the accumulated text-recognition result and a next accumulated text-recognition result based on an approximate model of the next accumulated text-recognition result, wherein estimating the distance between the accumulated text-recognition result and the next accumulated text-recognition result comprises, for each previous text-recognition result, calculating a distance between the accumulated text-recognition result and a combination of the accumulated text-recognition result with the previous text-recognition result, and
wherein the distance between the accumulated text-recognition result and the next accumulated text-recognition result is calculated using $$\frac{2G_n}{G_n + 2S_n},$$

wherein $G_n$ is a sum of generalized Levenshtein distances between the accumulated text-recognition result and combinations of the accumulated text-recognition result with the previous text-recognition results, and
wherein $S_n$ is a number of vectors of class estimations in the accumulated text-recognition result, and
determine whether or not to stop the processing based on the estimated distance; and,
after stopping the processing, output a character string based on the accumulated text-recognition result.

\* \* \* \* \*